May 21, 1940.   H. C. BOSTWICK   2,201,469
COLLAPSIBLE FORM
Filed March 7, 1939

Inventor,
H. C. Bostwick,
By Robert M. Pierson,
Attorney

Patented May 21, 1940

2,201,469

UNITED STATES PATENT OFFICE 2,201,469

COLLAPSIBLE FORM

Henry C. Bostwick, Coventry Township, Summit County, Ohio, assignor to The Akron Standard Mold Company, Akron, Ohio, a corporation of Ohio Application March 7, 1938, Serial No. 194,255

7 Claims. (Cl. 154—9)

This invention relates to collapsible segmental forms or drums of the general type, including those of the specific floating-hinge variety, disclosed respectively in my Patents Nos. 2,042,498, dated June 2, 1936, and 2,020,497, dated November 12, 1935, for building tire-forming bands or performing analogous operations.

In making pneumatic tires by the semi-flat, pulley-band or partial shaping method on flat-crowned drums having relatively deep bead flanges, it has become increasingly difficult to withdraw the finished tire band from the collapsed drum as the ratio of band width to diameter and the corresponding ratio of cross section of the tire casing to its bead diameter increases. I find it desirable to have that part of the drum which remains permanently mounted on the tire machine shaft, or the whole of it, collapsed to a more nearly circular or less prolate form than heretofore, and preferably to provide a partly removable segmental surface in order that the remainder may collectively approach that shape in collapsed condition. It is the principal object of my present invention to accomplish such results, either in whole or in part.

Of the accompanying drawing, Fig. 1 is a transverse section through the tire machine shaft, taken approximately on the line 1—1 of Fig. 3 after removal of the segmental bead-seating flange on the inward side, showing a preferred form of my improved drum, in the expanded condition.

Figure 1:
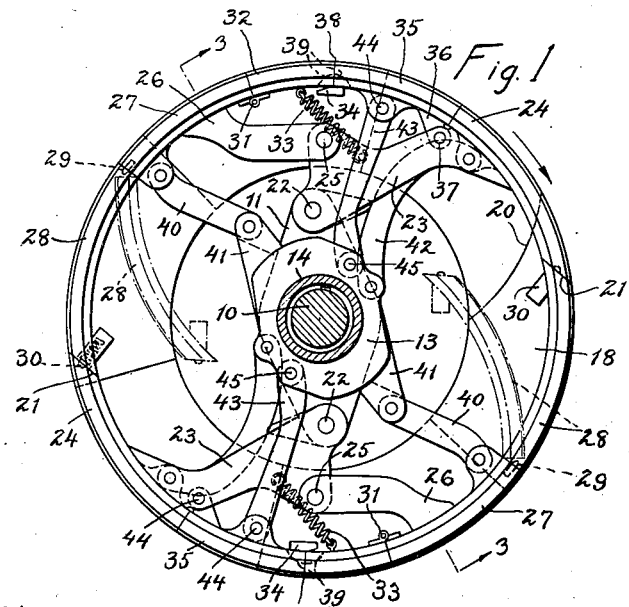

The illustrated drum is of the brake-controlled variety disclosed in my two aforesaid patents, wherein collapse is effected through the power of forward rotation of the drum by retarding a toggle control collar surrounding the drum shaft and linked with the hinged segments, said segments being arranged in couples, whose members in the present instance are of articulated construction, on opposite sides of the center of rotation, so that the rotating masses may be substantially in rotational balance in both the expanded and the collapsed condition.

In the drawing, 10 is the horizontal rotary power shaft of the tire building machine, on whose outer end is mounted the drum structure. The latter includes a spider 11 composed of a pair of opposite segment supporting arms and a hub 12 fastened upon the shaft 10, and a control collar or swing-arm member 13 concentrically surrounding said spider hub to rotate with or relative thereto, and adapted to be retarded in the customary manner by the application of a brake band (not shown) to a sleeve 14 whose forward end flange is secured to the rear end of collar 13, together with linkage which will be described, connecting said control collar with the several controllable drum segments.

The middle of the tire band is formed about the substantially cylindrical segmental drum or chuck body, each of whose segments preferably includes, as is customary and shown in my aforesaid patents, a base member 15, a pair of wing members 16 mounted for widthwise adjustment thereon and adapted to be secured by fastening screws mounted in slots and not herein shown, and a thin gap-shield member 17 carried by a middle rib on the base segment. A further preferred feature, partly illustrated but not claimed herein, comprises a pair of undercut shoulder-forming and bead-seating rings 18 of segmental construction, detachably mounted in the ends of the expanded drum body and interlocking therewith by tongue-and-groove connections 19 substantially after the manner disclosed in my Patent No. 2,073,729 of March 16, 1937. Each of said rings comprises a train of a suitable number, such as six, segments having the adjoining ends of some of them held in registry by any appropriate means such as the dowels disclosed in my copending application Serial No. 132,500, filed March 23, 1937, now Patent No. 2,168,897 of August 8, 1939, the two end segments, one of which is a key segment, having an arcuate concavo-convex joint 20 permitting pivotal insertion and removal of the convex-ended key segment, substantially as described for a three-segment end ring in my aforesaid Patent No. 2,073,729, said end segment being detachably locked together by any suitable means, omitted from this illustration, such as one of the toggle lever devices disclosed in said Patent No. 2,168,897.

While the number of drum sections here employed might vary, I have shown ten sections divided into two groups of oppositely swinging articulated couples having underlapping and overlapping end members meeting in the expanded condition in complementally beveled joints 21. There are actually four main segment structures, each composed of a couple of body members having heel members pivotally articulated thereon, and two opposite body members are provided with detachable toe members.

The primary heel support of each segment group is on a pin 22, whereby duplicate inwardly extending hinge lugs 23 of the endmost, overlapping body segment or member 24 are pivoted in a bearing at the outer end of one of the arms of the spider 11. To a pair of floating hinge pivots 25 which are carried by the hinge lugs 23 radially outward of the pins 22, are pivoted the hinge lugs 26 of the body member 27 of an articulated underlapping segment whose free-end outer or toe member 28 is detachably connected at its inner end by a dowel joint 29 with the adjoining end of member 27, the opposite end of member 28 being separably registered at the bevel joint 21 with the adjoining end of the overlapping segment 24 of the opposite group by ball-pointed spring latch means 30 of familiar form, in such manner as to permit pivotal inward detachment of member 28 as shown by broken lines in Fig. 1, followed by removal thereof when it is desired to collapse the rest of the drum.

To the posterior inner or heel end of the body member 27 of the underlapping segment in each group is connected, by a hinge 31, a heel or inner member 32 substantially of the character disclosed in my application Serial No. 163,268, filed September 10, 1937, adapted to be yieldingly retracted, when the drum is collapsed, by a spring 33 connecting its inner side with a point on one of the hinge lugs 23 of the underlapping segment, and positively projected during expansion of the drum by the action of a cam-like member 34 having an inclined outer surface engaging the adjacent inner corner edge of said member.

According to the present invention, the overlapping segment structure in each group is articulated with a heel member or segment 35 having a pair of lugs 36 on its inner side and pivot pins 37 whereby it is hinged on the main hinge lugs 23 of the body member 24. This segment 35 carries the cam member 34, underlying the abutting faces or joint 38 between it and the heel segment 32, where the respective articulated segment structures 27, 32 on the one hand and 24, 35 on the other hand divide to swing in opposite directions to a folded or collapsed position. Adjacent to this joint, on opposite sides of the cam member 34, the inner sides of the members 32 and 35 are recessed at 39 to accommodate the hinge knuckles formed by the lugs 23 and 26 in the fully collapsed condition of the drum represented in Fig. 2.

A linkage for operating the several controllable segments comprises, for the underlapping segment structures, the usual short links 40 pivotally connected at their outer ends with the body segments 27 and at their inner ends with oppositely projecting arms 41 on the control collar 13; for the overlapping segment structures, bent long links 42 pivotally connected at their outer ends with the body segments 24 and at their inner ends with points on said control collar 13 relatively close to the central drum axis; and for the new pair of heel segments 35, duplex long links 43 pivotally connected by pins 44 at their outer ends with lugs on the inner side of said segments 35, and at their inner ends by pins 45 with points on the control collar 13 circumferentially spaced from the inner connections of the links 42 and on about the same radii as the latter.

In the operation of this invention, the drum being in its expanded condition as shown in Fig. 1, a tire-forming band is built thereon in the customary manner with laminations of rubberized cord carcass fabric, with bead rings incorporated in the edges thereof, and auxiliary strips and outer rubber. On completion of the band, the rotation of the drum is stopped by means of a brake applied to its shaft. The bead-seating end rings 18 are then broken down and removed, piece by piece, from the interior of the drum, through the central openings of the beads. The two detachable toe members 28 are then successively disconnected, first by knocking or otherwise forcing inwardly the toe end to release the latch 30 from the end of the adjoining overlapping segment and then disconnecting the dowels 29 at the heel end, followed by removal of the member 28 through the end opening of the drum.

Figure 2:
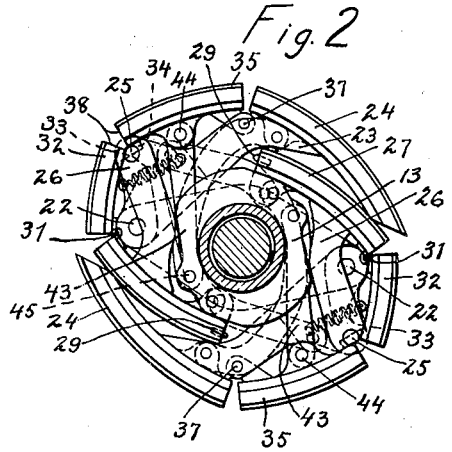
Fig. 2 is a corresponding view of the drum in its fully collapsed condition, after the removable segments have been detached.
Figure 3:
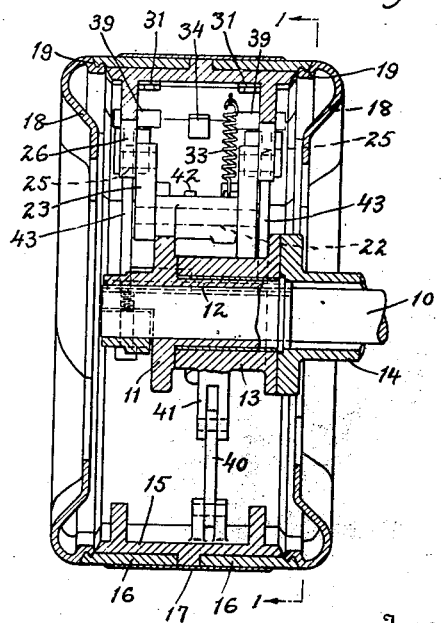
Fig. 3 is an axial section of the expanded drum, approximately on the line 3—3 of Fig. 1.

The remainder of the drum is then ready to be collapsed, this being accomplished by starting it again in forward rotation, and applying a brake to the sleeve 14 of the control collar or swing-arm member 13 to retard the latter so that, through the linkage 40, 42, 43, the segments are drawn inwardly, in proper timed relation, through the power of rotation of the drum, to the collapsed position shown in Fig. 2. This strips the segments inwardly from the adhesive surface of the band, whereupon the latter may be removed endwise from the collapsed drum. It will be noted in Fig. 2, that the several segments are compactly folded into a much reduced peripheral dimension which is more nearly circular or less prolate than heretofore. To expand the drum, the control collar 13 may be held while the shaft 10 is reversely rotated, unfolding the segments in an evident manner, whereupon the detachable toe members 28 may be restored, and the drum is ready for another building operation.

Some of the benefits of my invention would be attainable without the use of detachable toe members for the underlapping segments, with a proper proportioning of the parts, in cases where a smaller degree of contraction and a less nearly circular collapsed form may suffice for the removal of a band of slightly larger bead diameter, or where the beads may be considerably distorted in removing the band. It will be understood that various other changes may also be made without departing from the scope of my invention as defined in the claims.

I claim:

1. A form for semi-flat tire-band building comprising a rotary segment support, and a drum body having two similar groups of segments, pivotally and symmetrically mounted on opposite sides of said support, and collapsible in a double convolute to reduce the effective outer circumference of the form, the segment toe ends in the respective groups being normally in overlapping and underlapping relation with members of the opposite group, the overlapping segment in each group comprising a pivoted body member and an inner or heel member pivotally articulated thereon, interposed between said body member and the inner end or heel of the underlapping segment in that group, in angularly foldable relation to each of the latter to obtain a minimum collapsed circumference.

2. A form according to claim 1 in which each underlapping segment comprises a body member and a detachable toe member having a butt-joint doweled connection therewith.

3. A drum according to claim 1 having not less than six hinged sections, a retardable control member concentrically rotatable with or relative to the segment support, and linkage connecting the control member with the toe and heel members of the articulated segments for positively moving them angularly in different degrees to a collapsed position on retardation of said control member.

4. A drum comprising a rotary segment support, a retardable control member carried thereby, oppositely swinging segment structures pivotally mounted on said support on the same side of the axis of rotation and comprising body members, and heel members pivotally articulated on said body members and substantially meeting each other in the expanded condition of the drum, devices for yieldingly retracting one of said heel members during collapse and positively projecting it during expansion, and toggle linkage connecting said control member with the other heel member for positively retracting and projecting the latter during collapse and expansion.

5. A drum according to claim 4 in which the linkage-controlled heel member has a cam coacting with the adjacent heel member for controlling the latter's angular movements with relation to its body member.

6. A drum comprising a rotary segment support, a peripheral portion composed of swinging segment structures having their toe ends in overlapping and underlapping relation, the overlapping structures being pivoted on said support and articulated with hinged heel members, the underlapping structures being respectively connected by floating pivots with the overlapping structures on the same side of the segment support and also being articulated with hinged heel members adjacent to the first-said heel members, and interconnected means for retracting and projecting said structures including their heel members, to collapse and expand the drum.

7. A drum according to claim 6 in which the underlapping structures are provided with detachable toe members.

HENRY C. BOSTWICK.